(12) United States Patent
Kim et al.

(10) Patent No.: US 8,129,050 B2
(45) Date of Patent: Mar. 6, 2012

(54) ANODE ACTIVE MATERIAL, AND ANODE AND LITHIUM BATTERY CONTAINING THE SAME

(75) Inventors: Han-su Kim, Seoul (KR); Dong-min Im, Seoul (KR); Seok-gwang Doo, Seoul (KR); Seung-sik Hwang, Seongnam-si (KR); Hun-Joon Sohn, Seoul (KR); Su-keun Yoon, Gwangmyoung-si (KR); Sung-Il Lee, Seoul (KR)

(73) Assignees: SAMSUNG SDI Co., Ltd., Suwon-si, Gyeonggi-do (KR); Seoul National University Industry Foundation, Seoul (KR)

( * ) Notice: Subject to any disclaimer, the term of this patent is extended or adjusted under 35 U.S.C. 154(b) by 552 days.

(21) Appl. No.: 12/335,892

(22) Filed: Dec. 16, 2008

(65) Prior Publication Data

US 2009/0197176 A1 Aug. 6, 2009

(30) Foreign Application Priority Data

Jan. 31, 2008 (KR) ........................ 10-2008-0010288

(51) Int. Cl.
*H01M 4/38* (2006.01)

(52) U.S. Cl. .................................. 429/231.5; 429/218.1
(58) Field of Classification Search ................ 429/218.1, 429/231.5
See application file for complete search history.

(56) References Cited

U.S. PATENT DOCUMENTS 6,949,312 B1 9/2005 Kawakami et al.
(Continued)

FOREIGN PATENT DOCUMENTS

JP 2006-134784 5/2006

OTHER PUBLICATIONS

Idota, et al. Tin-Based Amorphous Oxide: A High-Capacity Lithium-Ion-Storage Material. Science 276, 1395 (1997).

(Continued)

*Primary Examiner* — Stuart Hendrickson
(74) *Attorney, Agent, or Firm* — Lee & Morse, P.C.

(57) ABSTRACT

An anode active material including a tin (Sn)-cobalt (Co) intermetallic compound, titanium (Ti), and carbon (C). The anode active material can include indium (In), niobium (Nb), germanium (Ge), molybdenum (Mo), aluminum (Al), phosphorus (P), gallium (Ga), bismuth (Bi), and/or silicon (Si). The anode active material can be included in an anode, and the anode can be included in lithium battery.

21 Claims, 2 Drawing Sheets

U.S. PATENT DOCUMENTS 7,820,324 B2 * 10/2010 Mizutani et al. ........... 429/218.1

OTHER PUBLICATIONS

Mao, et al. Active/Inactive Nanocomposites as Anodes for Li-Ion Batteries. Electochem. Solid State and Lett., 2, 3 (1999).

Kim, et al. The Insertion Mechanism of Lithium into Mg2Si Anode Material for Li-Ion Batteries. J. Electrochem. Soc., 146, 4401 (1999).

Kepler, et al. $Li_xCu_6Sn_5$ (6<x<13): An Intermetallic Insertion Electrode for Rechargeable Lithium Batteries. Electochem. Solid State and Lett., 2, 307 (1999).

* cited by examiner

ANODE ACTIVE MATERIAL, AND ANODE AND LITHIUM BATTERY CONTAINING THE SAME

CROSS-REFERENCE TO RELATED PATENT APPLICATION

This application claims the benefit of Korean Patent Application No. 2008-10288, filed on Jan. 31, 2008, in the Korean Intellectual Property Office, the disclosure of which is incorporated herein in its entirety by reference.

BACKGROUND OF THE INVENTION

1. Field of the Invention

Aspects of the present invention relate to an anode active material, and an anode and lithium battery including the anode active material.

2. Description of the Related Art

Portable electronic devices, such as cameras, notebook computers, mobile phones, and the like, are widely used, small, lightweight devices. Lithium batteries are widely used as a power source of such portable electronic devices. Thus, there is a need for lithium batteries having an increased capacity that is maintained in spite of frequent charging and discharging.

A carbonaceous material with a relatively high capacity and good cycle-life properties, e.g., graphite, is widely used as an anode active material in lithium batteries. However, graphite has a very low theoretical capacity of 372 mAh/g. Thus, much research into materials that can replace graphite has been conducted. For example, research into an anode active material capable of alloying with lithium, e.g., Si, Sn, Al, or the like, has been conducted.

However, a material that is capable of alloying with lithium, such as Si, Sn, Al, or the like, may present several problems, including a volumetric expansion during the alloying, the creation of an electrically disconnected active material in an electrode, the aggravation of electrolytic decomposition, due to an increase in surface area, and so on. In order to overcome these problems, Science, 276, 1395 (1997) discloses an amorphous Sn-based oxide, in which the particle size of Sn particles is minimized, and the agglomeration of the Sn particles, during charge and discharge cycles, is prevented, thereby leading to an improvement in capacity retention characteristics. However, the Sn-based oxide inevitably causes a reaction between lithium and oxygen atoms, which is responsible for a considerable irreversible capacity.

To address these and/or other problems, Electochem. Solid State and Lett., 2, 3 (1999), Electochem. Solid State and Lett., 2, 307 (1999), and J. Electrochem. Soc., 146, 4401 (1999) disclose an anode active material including an intermetallic compound of Sn and Si, and Cu, Fe, and Mg. The particle size of the Sn and S intermetallic compound is minimized, and the active material does not form $Li_2O$, due to the absence of oxygen, and thereby has a high initial efficiency. However, the anode active material undergoes agglomeration as the cycle number is increased, because the particle size of the Sn and Si intermetallic compound increases. Thus capacity retention characteristic of the anode active material is gradually degraded.

To address these and/or other problems, U.S. Pat. No. 6,949,312 discloses an anode active material including an amorphous metal-carbon complex comprising Sn, a transition metal, and C. In addition, Japanese Patent Laid-Open Publication No. 2006-134784 discloses an Sn—Co—C complex obtained by mechanically milling an Sn—Co alloy and graphite, wherein the Sn—Co—C complex has very low crystallinity. However, there is still need to develop a method of improving the initial efficiency and cycle-life properties of an anode active material.

SUMMARY OF THE INVENTION

Aspects of the present invention provide an anode active material with an improved initial efficiency and cycle-life.

Aspects of the present invention also provide an anode including the anode active material.

Aspects of the present invention also provides a lithium battery including the anode.

According to an aspect of the present invention, there is provided an anode active material comprising: tin (Sn); 0.1 to 100 parts by weight of Ti, based on 100 parts by weight of the Sn; 10 to 150 parts by weight of Co, based on 100 parts by weight of the Sn; and 5 to 50 parts by weight of C, based on 100 parts by weight of the Sn.

According to aspects of the present invention, the amount of the Ti may be in a range of 10 to 40 parts by weight, based on 100 parts by weight of Sn.

According to aspects of the present invention, the active material may comprise $Sn_2Co$, SnCo, Ti, TiC, and C.

According to aspects of the present invention, the $Sn_2Co$, SnCo, Ti, and TiC may be in a crystalline form.

According to aspects of the present invention, the anode active material may further comprise silicon (Si) in a range of 1 to 30 parts by weight, based on 100 parts by weight of the Sn.

According to aspects of the present invention, the anode active material may further comprise at least one selected from the group consisting of indium (In), niobium (Nb), germanium (Ge), molybdenum (Mo), aluminum (Al), phosphorus (P), gallium (Ga), and bismuth (Bi), in a range of 1 to 30 parts by weight, based on 100 parts by weight of the Sn.

According to another aspect of the present invention, there is provided an anode comprising a current collector and an anode active material layer formed on the current collector. The anode active material layer comprises an anode active material, a conducting agent, and a binder. The anode active material comprises: tin (Sn); 0.1 to 100 parts by weight of Ti, based on 100 parts by weight of the Sn; 10 to 150 parts by weight of Co, based on 100 parts by weight of the Sn; and 5 to 50 parts by weight of C, based on 100 parts by weight of the Sn.

According to another aspect of the present invention, there is provided a lithium battery comprising a cathode, an anode, and an electrolytic solution. The anode comprises an anode active material comprising: tin (Sn); 0.1 to 100 parts by weight of Ti, based on 100 parts by weight of the Sn; 10 to 150 parts by weight of Co, based on 100 parts by weight of the Sn; and 5 to 50 parts by weight of C, based on 100 parts by weight of the Sn.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION OF THE EMBODIMENTS

Figure 1:
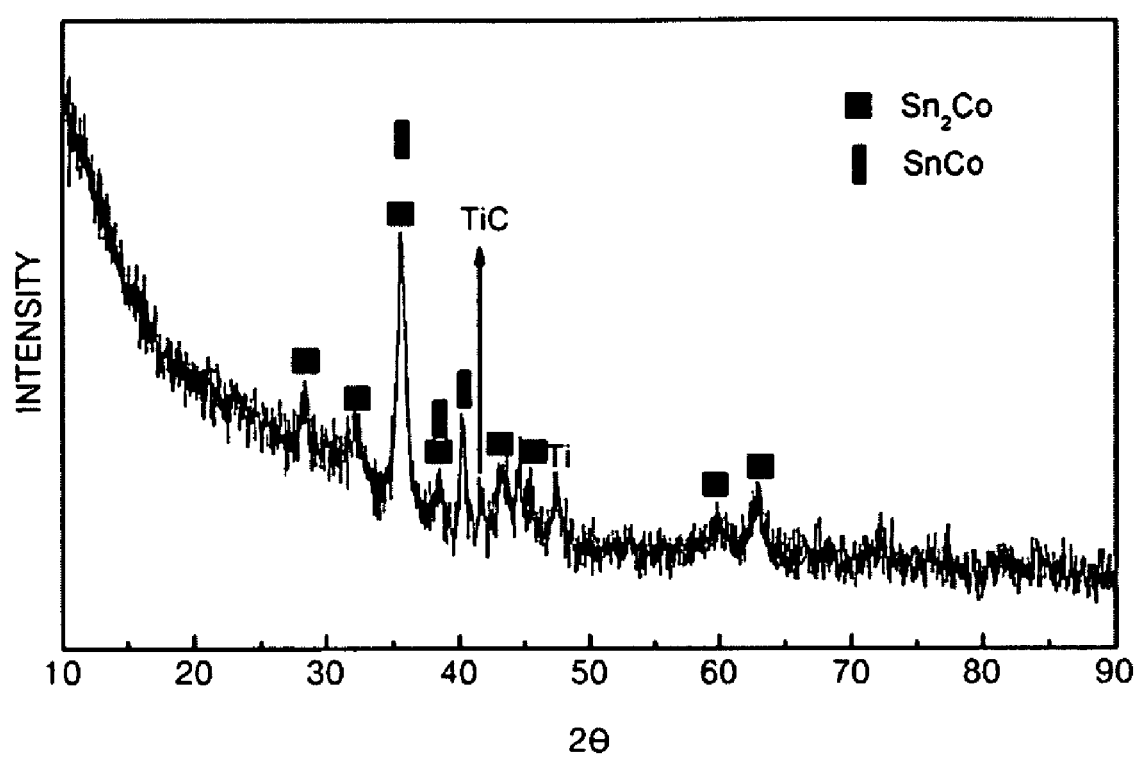
FIG. 1 is a graph showing X-ray diffraction (XRD) results of $Sn_2Co$, SnCo, Ti, and TiC, according to an exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

Aspects of the present invention provide an anode active material, which is a crystalline material obtained by combining cobalt (Co), titanium (Ti), and carbon (C), with a Sn—Co intermetallic compound. The anode active material has excellent initial efficiency and capacity retention. Thus, the anode active material is suitable for use in an anode of a lithium ion battery.

The anode active material comprises tin Sn, Ti, Co, and C. The anode active material has a crystalline structure, and thus, has an excellent initial efficiency and capacity retention.

Sn has a high reactivity with lithium, per unit mass, and can provide for a high capacity. However, the use of Sn alone causes several problems, including a volumetric expansion during the formation of a lithium alloy, the creation of an electrically disconnected active material in an electrode, and the aggravation of electrolytic decomposition, due to an increase in surface area.

The anode active material comprises Co, in addition to Sn, and thus, the problems described above and/or other problems can be prevented. As a result, the anode active material can have improved cycle-life properties. The amount of Co in the anode active material may be in a range of 10 to 150 parts by weight, in a range of 20 to 100 parts by weight, or in a range of 35 to 70 parts by weight, based on 100 parts by weight of the Sn. When the amount of Co is less than 10 parts by weight, the cycle-life of the anode active material may be reduced. When the amount of Co is greater than 150 parts by weight, the reversible capacity of the anode active material may be decreased. The Sn and Co can exist in the form of $Sn_2Co$ and/or SnCo, in the anode active material. The Sn and Co can be in a crystalline form.

The anode active material comprises Ti in addition to the Sn and Co. The Ti can be used to decrease the relative amount of carbon. Accordingly, an initial irreversible capacity, which is generated due to the carbon, can be decreased, and the formation and coarsening of the Sn, due to charging and discharging, can be prevented. This results in improved cycle-life characteristics.

The amount of the Ti included in the anode active material may be in a range of 1 to 100 parts by weight, in a range of 5 to 50 parts by weight, or in a range of 10 to 40 parts by weight, based on 100 parts by weight of the Sn. When the amount of Ti is less than 1 part by weight, the cycle-life characteristics may not be significantly improved. When the amount of Ti is greater than 100 parts by weight, the relative amount of Sn is decreased, and thus, the reversible capacity of the anode active material may be relatively reduced.

The Ti may exist in the form of a simple crystalline substance in the anode active material, or may be in the form of crystalline titanium carbide (TiC). However, Ti and TiC may also exist in an amorphous form, according to the particular manufacturing process.

The anode active material comprises carbon. The amount of carbon may be in a range of 1 to 50 parts by weight, in a range of 5 to 40 parts by weight, or in a range of 15 to 20 parts by weight, based on 100 parts by weight of the Sn. When the amount of carbon is less than 1 part by weight, the improvement in cycle-life, due to the addition of carbon, may be insignificant. When the amount of carbon is greater than 50 parts by weight, the capacity of the anode active material may be decreased.

In the anode active material, at least some of the carbon atoms may be bound to one of the constituent metallic or semi-metallic elements. The cycle-life properties may be decreased, due to agglomeration or crystallization of the Sn, or the like, and thus, carbon is bound to the other elements, to prevent/reduce the agglomeration or crystallization of the Sn. The carbon may exist in an amorphous form, and in particular, in an amorphous form at a grain boundary between the crystalline components.

The carbon may be at least one carbon material selected from the group consisting of hard carbon, a reversible graphitized carbon, a graphite, a grapheme, a pyrolytic carbon, a coke, a glass carbon, an organic polymer compound sintered body, an activated carbon, carbon black, and the like. The carbon material may be in any form, for example, a fibrous form, a spherical form, a granular form, a scale form, or the like.

The anode active material may comprise silicon (Si). Si has a high reactivity with lithium, and can further improve the initial capacity of the anode active material. The amount of Si may be in a range of 1 to 30 parts by weight, based on 100 parts by weight of the Sn. When the amount of Si is less than 1 part by weight, the capacity of the anode active material may not be sufficiently increased. When the amount of Si is greater than 30 parts by weight, the anode active material is finely pulverized during charging and discharging, which may result in poor cycle-life properties.

The anode active material may comprise at least one selected from the group consisting of In, Nb, Ge, Mo, Al, P, Ga, and Bi. The amount thereof may be in a range of 1 to 30 parts by weight, based on 100 parts by weight of the Sn.

Each constituent element of the anode active material may be in a crystalline or amorphous form. According to some embodiments, the anode active material may exist in a crystalline form, to augment the initial efficiency and capacity retention thereof.

The crystalline elements may be analyzed by X-ray diffraction (XRD) or X-ray photoelectron spectroscopy (XPS). FIG. 1 is a graph showing an X-ray diffraction (XRD) analysis of the SnCo, $Sn_2Co$, Ti, and TiC. When the anode active material has the peaks illustrated in FIG. 1, the anode active material includes the material corresponding to the peak. Carbon exists in an amorphous form, and thus, is not detected by XRD.

The anode active material may be prepared by compositing cobalt and carbon, adding tin and titanium thereto, and then performing mechanical alloying, mechanical milling, or the like. The degree of crystallization of the anode active material is adjusted by varying conditions of the milling time and the like, and thus, the anode active material can be crystallized, partially crystallized, or amorphized. The cobalt and carbon may be obtained by heat treating (1) a Co-containing organic compound, (2) a mixture of a carbon material and a Co metal or Co-containing compound, or (3) a mixture of carbon and a Co metal or Co-containing compound, in an inert atmosphere or in a reducing atmosphere. The Co-containing compound may be a Co-containing oxide, a chloride, or sulfide.

When the anode active material is prepared, the average size of the crystalline phase thereof can be adjusted by appropriately varying treatment conditions. In this case, the longer the treatment time, the smaller the average size of the crystalline phase. As a result, the anode active material can be amorphous and/or crystalline.

The anode active material may be prepared by mixing each constituent element, or by using an alloy or a composite of each constituent element, but the present invention is not limited thereto. The alloy can be SnCo, SnTi, TiCo, or the like, and the mixture can be a composite of carbon and a metal, for example, the SnC, TiC, CoC, or the like. Each constituent element in the form of a simple body, alloy, or composite, is mixed and mechanically treated to produce a crystalline or amorphous structure, and the reaction time can be shortened. In addition, these materials can be in a powdered or solid form; however, the present invention is not limited thereto.

The anode active material is used together with a conducting agent, a binder, and the like, to form an anode active material layer. The anode active material layer is disposed on a current collector to form an anode. The current collector may be copper, nickel, or stainless steel (SUS). A conducting agent, a binder, and a solvent are mixed to prepare an anode active material composition. The composition is directly coated on the current collector, or cast as a film on a separate support. The anode active material film is separated from the support and laminated on the current collector.

The conducting agent used to form the anode active material layer may be carbon black. Examples of the binder include a vinylidene fluoride/hexafluoropropylene copolymer, a polyvinylidene fluoride, a polyacrylonitrile, a polymethylmethacrylate, a polytetrafluoroethylene, mixtures of these materials, and a styrene butadiene rubber polymer. The solvent may be N-methyl pyrrolidone, acetone, water, or the like. The amounts of the anode active material, the conducting agent, the binder, and the solvent may be amounts that are commonly used in a lithium battery, but the present invention is not limited thereto.

The anode may be used in a lithium battery. The lithium battery, according to aspects of the present invention, can be manufactured in the following manner.

First, an anode active material, a conducting agent, a binder, and a solvent are mixed to prepare an anode active material composition. The composition is directly coated on a current collector, or cast on a separate support and then laminated on the current collector, to obtain an anode plate. The anode plate is surface treated with an amine group-containing compound, to form a surface-treated anode.

As in the case of the anode plate, a cathode active material, a conducting agent, a binder, and a solvent are mixed, to prepare a cathode active material composition. The cathode active material composition is directly coated on an aluminum current collector and dried, to prepare a cathode plate. In an alternative embodiment, the cathode active material composition may be cast on a separate support, and then peeled off from the support and laminated on the aluminum current collector, to form a cathode plate.

The cathode active material may be a lithium-containing metal oxide that is commonly used in the art. Examples of the lithium-containing metal oxide include: $LiCoO_2$; $LiMn_xO_{2x}$, where x=2; $LiNi_{x-1}Mn_xO_{2x}$, where x=1, 2; and $LiNi_{1-x-y}Co_xMn_yO_2$, where $0 \leq x \leq 0.5$ and $0 \leq y \leq 0.5$. The conducting agent, the binder, and the solvent in the cathode active material composition are the same as those in the anode active material composition. The amounts of the cathode active material, the conducting agent, the binder, and the solvent may be amounts that are commonly used in a lithium battery. The cathode active material composition and the anode active material composition may further include a plasticizer to form pores inside the cathode or anode plate.

Any separator that is commonly used for lithium batteries can be used. In particular, a separator may have low resistance to the migration of ions in an electrolyte and may have an excellent electrolyte-retaining ability. Examples of the separator include glass fiber, polyester, Teflon, polyethylene, polypropylene, polytetrafluoroethylene (PTFE), a combination thereof, and a material which may be in a non-woven or a woven fabric form. In particular, a windable separator formed of a material such as polyethylene, polypropylene, or the like can be used for the lithium ion battery. A separator capable of retaining a large amount of an organic electrolytic solution may be used for the lithium-ion polymer battery. A method of forming these separators will now be described.

A polymer resin, a filler, and a solvent are mixed, to prepare a separator composition. The separator composition is directly coated on an electrode, and then dried to form a separator film. Alternately, the separator composition can be cast on a separate support and dried, and then a separator film is peeled from the support and is laminated on the electrode.

The polymer resin is not particularly limited, and can be any material that is used in the binder of electrode plates. Examples of the polymer resin include a vinylidenefluoride/hexafluoropropylene copolymer, a polyvinylidenefluoride, a polyacrylonitrile, a polymethylmethacrylate, and a mixture thereof. In particular, the polymer resin may be a vinylidenefluoride/hexafluoropropylene copolymer including 8 to 25 wt % of hexafluoropropylene.

The separator is interposed between the cathode plate and the anode plate to form an electrode assembly. The electrode assembly is wound or folded and then sealed in a cylindrical or rectangular battery case. Then, an organic electrolytic solution is injected into the battery case, to complete the lithium ion battery. Alternatively, a plurality of electrode assemblies may be stacked and impregnated into an organic electrolytic solution. The resultant structure is put into a pouch and hermetically sealed, thereby completing the manufacture of a pouch-type lithium ion polymer battery.

The organic electrolytic solution includes a lithium salt and a mixed organic solvent including a high dielectric solvent and a low boiling point solvent. The organic electrolyte solution may further include a variety of additives, such as an overcharge preventing agent. The high dielectric solvent may be any high dielectric solvent that is commonly used in the art. Examples of the high dielectric solvent may include a cyclic carbonate, such as an ethylene carbonate, a propylene carbonate, and a butylene carbonate, and a γ-butyrolactone.

The low boiling point solvent may be any low boiling point solvent that is commonly used in the art. Examples of the low boiling point solvent may include a chain-type carbonate, such as a dimethyl carbonate, an ethylmethyl carbonate, a diethyl carbonate, and a dipropyl carbonate, a dimethoxyethane, a diethoxyethane, and a fatty acid ester derivative, but the present invention is not limited thereto.

At least one hydrogen atom in each of the high dielectric solvent and the low boiling point solvent may be substituted with a halogen atom, such as a fluorine atom. The mixed volumetric ratio of the high dielectric solvent and the low boiling point solvent may be in a range of 1:1 to 1:9. When the mixed volumetric ratio is outside this range, discharging capacity and charge-discharge cycles may be decreased.

In addition, the lithium salt used in the organic electrolytic solution may be any lithium salt that is commonly used in lithium batteries. The lithium salt may comprise at least one compound selected from the group consisting of $LiClO_4$, $LiCF_3SO_2$, $LiPF_6$, $LiN(CF_3SO_2)_2$, $LiBF_4$, $LiC(CF_3SO_2)_3$, and $LiN(C_2F_5SO_2)_2$.

The concentration of the lithium salt in the organic electrolytic solution may be in a range of 0.5 to 2 M. When the concentration of the lithium salt is less than 0.5 M, the conductivity of the organic electrolytic solution may be decreased, and thus, the performance of the organic electrolytic solution may be reduced. When the concentration of the lithium salt is greater than 2.0 M, the viscosity of the organic electrolytic solution is increased, and thus, the mobility of lithium ions may be decreased.

Aspects of the present invention will now be described in more detail with reference to the following examples. However, these examples are for illustrative purposes only and are not intended to limit the scope of the present invention.

Example 1

1.5 g of Sn, 0.075 g of Ti, and 1.425 g of a cobalt-carbon material (a weight ratio of cobalt to carbon was 78:22) were put into a stainless steel container and ball milled at 500 rpm, for 25 hours, to prepare an anode active material. The total weight of the metal balls in the ball mill was 20 times heavier than the total weight of the Sn and the cobalt-carbon material. A vibrating mill (Jeongseok Engineering Co., Ltd, Korea) was used for the ball milling.

Example 2

An anode active material was prepared in the same manner as in Example 1, except that the amount of the Ti was 0.15 g, instead of 0.075 g.

Example 3

An anode active material was prepared in the same manner as in Example 2, except that the milling was performed for 30 hours, instead of 25 hours.

Example 4

An anode active material was prepared in the same manner as in Example 1, except that the amount of the Ti was 0.225 g, instead of 0.075 g, and the amount of the cobalt-carbon material was 1.275 g, instead of 1.425 g.

Comparative Example 1

1.5 g of Sn and 1.5 g of a cobalt-carbon material (a weight ratio of cobalt to carbon was 78:22) were ball milled at 500 rpm, for 25 hours, to prepare an anode active material. The total weight of the metal balls in the ball mill was 20 times the total weight of the Sn and the cobalt-carbon material. A vibrating mill (Jeongseok Engineering Co., Ltd, Korea) was used.

Comparative Example 2

An anode active material was prepared in the same manner as in Comparative Example 1, except that 0.15 g of Co was added, and 1.35 g of the cobalt-carbon material was used.

Comparative Example 3

An anode active material was prepared in the same manner as in Comparative Example 1, except that 0.225 g of Co was added, and 1.275 g of the cobalt-carbon material was used.

Preparation of Anode

To each of the anode active materials (in powder form) prepared in Examples 1 through 4 and Comparative Examples 1 through 3, graphite powder (SFF-6, Timcal, Inc.), styrene-butadiene rubber, and carboxymethyl cellulose (SBR-CMC) as a binder, were added and mixed in a weight ratio of 65:32:3. The mixture was stirred using a mechanical stirrer, to prepare a slurry. The slurry was coated on a Cu current collector, to a thickness of about 50 μm, using a doctor blade, and then dried. Subsequently, the Cu current collector coated with the slurry was dried in vacuum, at 120° C., for 2 hours, to prepare an anode plate.

Assembly of Lithium Battery

A 2016-standard coin cell was prepared using each of the anode plates formed of the anode active materials of Examples 1 through 4 and Comparative Examples 1 through 3, a counter electrode formed of a lithium metal, a polypropylene separator (Cellgard 3510), and an electrolytic solution including 1.3 M $LiPF_6$, which was melted in a mixture of ethylene carbonate (EC) and diethyl carbonate (DEC) (weight ratio of 3:7).

Experimental Example 1

Measurement of Performance of Lithium Battery

The coin cells were each charged until the voltage of the cells reached 0.001 V, with reference to the Li electrode, and then discharged until the voltage of the cells reached 1.5 V, with reference to the Li electrode. The charge-discharge tests were repeated for 50 cycles. During an evaluation, the current conditions were 50 mA per 1 g of the electrode.

TABLE 1

| | Composition and milling time | Initial capacity [mAh/g] | Initial capacity [mAh/cc] | Initial efficiency [%] | Capacity retention rate [%, 50 cycle/1 cycle] |
|---|---|---|---|---|---|
| Example 1 | Sn:Co:Ti:C(50:35.1:5:9.9), 25 hour | 366 | 1138 | 78.2 | 101.9 |
| Example 2 | Sn:Co:Ti:C(50:31.2:10:8.8), 25 hour | 398 | 1155 | 83.1 | 102.8 |
| Example 3 | Sn:Co:Ti:C(50:31.2:10:8.8), 30 hour | 380 | 1198 | 86.3 | 86.6 |

TABLE 1-continued

|  | Composition and milling time | Initial capacity [mAh/g] | Initial capacity [mAh/cc] | Initial efficiency [%] | Capacity retention rate [%, 50 cycle/1 cycle] |
|---|---|---|---|---|---|
| Example 4 | Sn:Co:Ti:C(50:27.3:15:7.7), 25 hour | 351 | 1118 | 83.3 | 85.0 |
| Comparative Example 1 | Sn:Co:C(50:39:11), 25 hour | 373 | 1196 | 79.2 | 94.3 |
| Comparative Example 2 | Sn:Co:C(50:41.2:.8.8), 25 hour | 363 | 1166 | 82.1 | 87.8 |
| Comparative Example 3 | Sn:Co:C(50:42.3:7.7), 25 hour | 350 | 1103 | 83.0 | 87.1 |

As shown in Table 1, the anode active materials of Examples 1 to 4, had improved initial efficiency and capacity retention properties, as compared to the anode active materials of Comparative Examples 1 to 3. However, when the Ti was amorphized, by increasing the milling time, the capacity retention properties were reduced.

Experimental Example 2

X-Ray Diffraction Measurement

Figure 2:
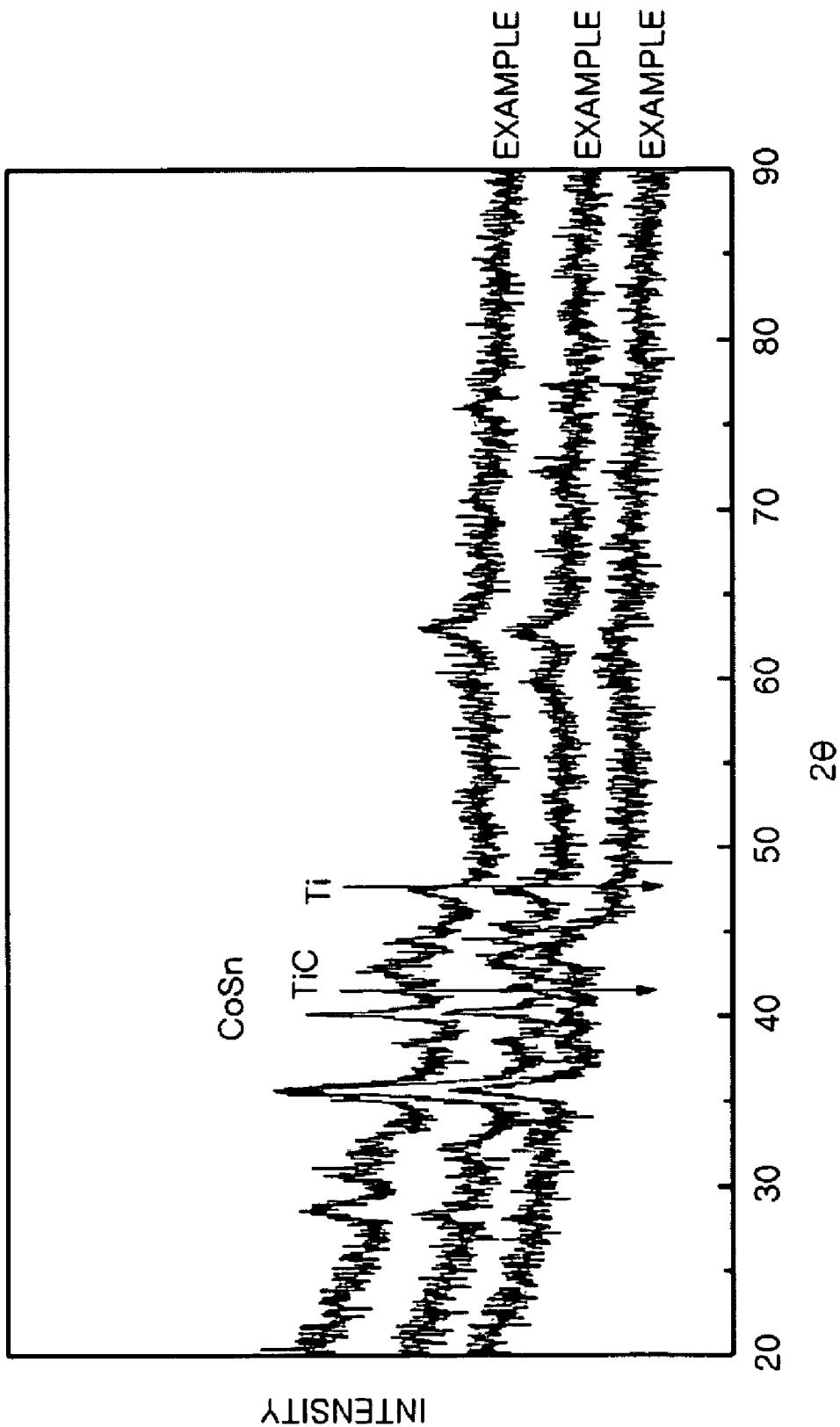
FIG. 2 is a graph showing XRD results of anode active materials prepared in Examples 2, 3, and 4.

X-ray diffraction (XRD) intensities, of the anode active materials prepared in Examples 2, 3, and 4, were measured. The results are illustrated in FIG. 2. As illustrated in FIG. 2, the anode active material comprises $Sn_2Co$, SnCo, Ti, and TiC, which had a crystalline structure. The carbon was not detected by the XRD, due to its amorphous structure. However, in the case of Example 3, the patterns of Ti and TiC were not detected, unlike the other cases. This is assumed to be because the components were amorphized, due to the increased milling time.

The anode active material, according to aspects of the present invention, exhibits excellent initial efficiency and cycle-life properties, and thus, an anode and lithium battery using the anode active material have excellent electrical characteristics.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. An anode active material comprising:
   tin (Sn);
   0.1 to 100 parts by weight of titanium (Ti), based on 100 parts by weight of the Sn;
   10 to 150 parts by weight of cobalt (Co), based on 100 parts by weight of the Sn; and
   5 to 50 parts by weight of carbon (C), based on 100 parts by weight of the Sn,
   wherein at least a portion of the Ti and C is present in the anode active material as titanium carbide (TiC).

2. The anode active material of claim 1, wherein the amount of Ti is in a range of 10 to 40 parts by weight, based on 100 parts by weight of the Sn.

3. The anode active material of claim 1, wherein the elements of the anode active material are in the form of $Sn_2Co$, SnCo, Ti, TiC, and C.

4. The anode active material of claim 3, wherein the $Sn_2Co$, SnCo, Ti, and TiC are in a crystalline form.

5. The anode active material of claim 1, further comprising silicon (Si), in a range of 1 to 30 parts by weight, based on 100 parts by weight of the Sn.

6. The anode active material of claim 1, further comprising at least one element selected from the group consisting of indium (In), niobium (Nb), germanium (Ge), molybdenum (Mo), aluminum (Al), phosphorus (P), gallium (Ga), and bismuth (Bi), in a range of 1 to 30 parts by weight, based on 100 parts by weight of the Sn.

7. An anode comprising:
   a current collector; and
   an anode active material layer formed on the current collector, comprising the anode active material of claim 1, a conducting agent, and a binder.

8. An anode comprising:
   a current collector; and
   an anode active material layer formed on the current collector, comprising the anode active material of claim 2, a conducting agent, and a binder.

9. An anode comprising:
   a current collector; and
   an anode active material layer formed on the current collector, comprising the anode active material of claim 3, a conducting agent, and a binder.

10. An anode comprising:
    a current collector; and
    an anode active material layer formed on the current collector, comprising the anode active material of claim 4, a conducting agent, and a binder.

11. An anode comprising:
    a current collector; and
    an anode active material layer formed on the current collector, comprising the anode active material of claim 5, a conducting agent, and a binder.

12. An anode comprising:
    a current collector; and
    an anode active material layer formed on the current collector, comprising the anode active material of claim 6, a conducting agent, and a binder.

13. A lithium battery comprising:
    a cathode;
    the anode according to claim 7; and
    an electrolytic solution.

14. A lithium battery comprising:
    a cathode;
    the anode according to claim 8; and
    an electrolytic solution.

15. A lithium battery comprising:
    a cathode;
    the anode according to claim 9; and
    an electrolytic solution.

16. A lithium battery comprising:
a cathode;
the anode according to claim 10; and
an electrolytic solution.

17. A lithium battery comprising:
a cathode;
the anode according to claim 11; and
an electrolytic solution.

18. A lithium battery comprising:
a cathode;
the anode according to claim 12; and
an electrolytic solution.

19. An anode active material comprising:
a tin (Sn)-cobalt (Co) intermetallic compound;
0.1 to 100 parts by weight of titanium (Ti), based on 100 parts by weight of the Sn; and
5 to 50 parts by weight of carbon (C), based on 100 parts by weight of the Sn,
wherein at least a portion of the Ti and C is present in the anode active material as titanium carbide (TiC).

20. The anode active material of claim 19, wherein:
the tin (Sn)-cobalt (Co) intermetallic compound is in the form of $Sn_2Co$ and/or SnCo.

21. The anode active material of claim 20, wherein:
the $Sn_2Co$, SnCo, Ti, and TiC are in a crystalline form; and
the C is an amorphous form and is disposed at a grain boundary between the crystalline $Sn_2Co$, SnCo, Ti, and TiC.

* * * * *